United States Patent [19]
Tan et al.

[11] Patent Number: 5,959,684
[45] Date of Patent: Sep. 28, 1999

[54] METHOD AND APPARATUS FOR AUDIO-VIDEO SYNCHRONIZING

[75] Inventors: Yew-Koon Tan, San Jose; Gong-san Yu, Milpitas, both of Calif.

[73] Assignees: Sony Corporation, Tokyo, Japan; Sony Electronics Inc., Park Ridge, N.J.

[21] Appl. No.: 08/901,090

[22] Filed: Jul. 28, 1997

[51] Int. Cl.[6] ..................................... H04N 7/62
[52] U.S. Cl. ..................... 348/515; 348/500; 348/512; 348/423; 348/845
[58] Field of Search .................................. 348/515, 423, 348/512, 558, 568, 845, 845.1, 845.2, 845.3, 500; 375/354, 372; 370/509; H04N 7/62

[56] References Cited

U.S. PATENT DOCUMENTS

| | | | |
|---|---|---|---|
| 5,396,497 | 3/1995 | Veltman | 348/423 |
| 5,598,352 | 1/1997 | Rosenau et al. | 348/515 |
| 5,642,171 | 6/1997 | Baumgartner et al. | 348/515 |
| 5,661,728 | 8/1997 | Finotello et al. | 348/515 |
| 5,668,601 | 9/1997 | Okada et al. | 348/423 |
| 5,771,075 | 6/1998 | Rim et al. | 348/512 |
| 5,808,722 | 9/1998 | Suzuki | 348/515 |
| 5,812,201 | 9/1998 | Yoo | 348/423 |
| 5,815,634 | 9/1998 | Daum et al. | 348/515 |
| 5,841,472 | 11/1998 | Rim et al. | 348/423 |

OTHER PUBLICATIONS

Barry G. Haskell, et al., Digital Video: An Introduction to MPEG–2, Chapter 3, pp. 32–39, Chapman & Hall, 1997.

*Primary Examiner*—Michael H. Lee
*Assistant Examiner*—Jean W. Désir
*Attorney, Agent, or Firm*—Wood, Herron & Evans, L.L.P.

[57] ABSTRACT

A method and apparatus for synchronizing the playback of audio and video frames from a program source. The method associates an audio presentation time stamp ("PTS") value with an output audio frame. Selected ones of audio and video data packets include respective audio and video PTS values representing desired playback times of the respective audio and data associated therewith. The selected ones of the audio data packets further include audio frame numbers representing a number of output frames of audio to be played back between the selected ones of the audio data packets. The method comprises the steps of first storing the audio and video PTS values in respective audio and video PTS tables during an audio demultiplexing process. In addition, the audio frame numbers are stored in frame counters in association with respective PTS values during the demultiplexing process. Thereafter, the process sequentially decodes the audio and video input data to produce respective frames of audio and video which are presented to the user. With the presentation of each audio and video frame, the respective audio and video frame counters are selectively decremented. Upon detecting one of the audio frame counters having a zero value, the audio PTS value for that zero value audio frame counter is retrieved. Thereafter, the playback of the audio and video frames is selectively modified so that frames of audio and video are played back in synchronization.

33 Claims, 6 Drawing Sheets

METHOD AND APPARATUS FOR AUDIO-VIDEO SYNCHRONIZING

FIELD OF THE INVENTION

This invention relates to the digital processing of video to be displayed on a television screen and more particularly, to digitally synchronizing the audio and video being output to a video display.

BACKGROUND OF THE INVENTION

Almost all televisions manufactured today are capable of interfacing with different sources of program materials, for example, a VCR, a digital versatile or video disk ("DVD") player, cable, DSS, etc., that provide audio signals for creating sounds and associated video input signals for creating screen displays. Some of those sources provide digital audio and video input signals in accordance with the Moving Picture Expert Group MPEG-2 audio/video digital compression standard. Thus, contemporary televisions and/or DVD systems preferably have the capability of processing compressed digital input signals and providing digital output signals representing the desired images. Most often, those digital signals are converted to analog signals for use by known analog television display units.

The implementation of digital signal processing for providing a video display and associated audio from an audio-video source of program material presents numerous design challenges that were not encountered in the prior processing of analog audio and video signals. For example, with digital signal processing, the audio signals are separated from the video signals; and the audio and video are processed independently. However, the playback of the audio and video must be synchronized, so that there is a coordinated and coherent reproduction of the desired audio and video provided by the source of program material.

The program source preferably provides the audio and video data in respective data packets in an "MPEG-2" format. Each of the audio and video data pockets is received from the source of video material in a continuous data stream. Each packet of video data includes a header block followed by a data block. The data block may include any number, for example one to twenty, of frames of video data that may include a full field of video data or be a coded group of pictures that includes its own header block identifying the picture type and display order. The header block for a video data packet includes control information, for example, the identity of the format of the video data, the type of compression, if used, picture size, display order, and other global parameters. The audio data packet has a header block that again identifies the format of the audio data with instructions relating to how the audio data is to be decoded and processed to provide desired enhancements, if applicable. Following the header block, the audio data packet includes an audio data block that has any number of blocks or frames of audio data, for example, from one to approximately twenty blocks.

Selected ones of the header blocks of the audio and video data packets include a presentation time stamp ("PTS") value which is a time stamp that is applicable to that data packet. The PTS value is a time reference to a system time clock that was running during the creation or recording of the audio and video data. A similar system time clock is also running during the playback of the audio and video data, and if the audio and video data are played back at the times represented by their presentation time stamps, the audio and video data will be presented to the user in the desired synchronized manner. Therefore, the PTS is used to synchronize the presentation or playback of the audio and video data.

During the decoding of the audio data, it normally must be decompressed, reconstructed and enhanced in a manner consistent with the source of program material and the capabilities of the sound reproduction system. In some applications, audio data packets may contain up to six channels of raw audio data. Depending on the number of channels the sound reproduction systems can reproduce, for example, from two to six, the sound reproduction system selectively uses the channels of raw audio data to provide a number of channels of audio which are then stored in an audio FIFO.

The decoding of the video data normally requires decompression, conversion of partial frames into full frames and the recognition of full frames. Simultaneously with the decoding process, the frames of audio and video data are being output, that is, played back to the user; and that playback must be synchronized such that the frames of audio and video present a coordinated and coherent presentation.

As will be appreciated from the foregoing, demultiplexing the audio and video data pockets is a complex process of deconstructing the data packets and storing the necessary decoding instructions as well as the content data itself to permit the decoding and playback of the data in a synchronized manner. In accordance with one known technique the audio and video content data or raw data is stored in respective audio and video first-in, first-out ("FIFO") memories. The FIFOs have write and read pointers that are controlled by a memory controller, which, in turn, is under the general control of a CPU. The write pointers are driven as a function of the requirements of the demultiplexing process, which sequentially delivers data to each of the FIFOs. The read pointers are driven as a function of independent and parallel decoding processes, which sequentially read data from the FIFOs. In addition to loading the raw data into the FIFOs, the demultiplexing process sequentially writes the associated PTS values, if present, into memory locations in respective audio and video PTS tables. To associate the PTS values with data in the FIFOs, in addition to a PTS value, the location in the respective FIFO of the first byte of data received after the PTS, is typically written into the respective audio and video PTS table.

While the audio and video data is being loaded into the FIFO memories by the demultiplexing process, audio and video data is simultaneously and in parallel being read from the respective FIFOs during audio and video decoding and playback processes. While both are occurring, a supervisory process must monitor the time synchronization of the video and audio data being produced by the video and audio decoding processes. In the known technique described above, this is done by relating the read pointers in the FIFOs, as they are driven by the decoding processes, to the memory locations stored in the PTS tables. When the read pointer is sufficiently close to a stored location associated with a PTS, it can be determined that the PTS identifies the current time of the associated decoding process. PTS values identified in this manner may be compared to determine whether one decoding process is ahead or behind of another.

Unfortunately, this approach has distinct disadvantages which arise from the fact that, during the audio and video decoding processes, the read pointers for the respective FIFOs are automatically and continuously driven by decoding processes interacting directly with the memory controller independent of any instructions from the CPU. This must be the case because the entire process of demultiplexing audio and video data, as well as decoding and outputting the data must occur continuously in a synchronized manner.

The above-described technique for synchronizing the audio and video decoding and playback processes presents a significant challenge, due to delays inherent in the interaction of the supervisory process with the various decoding processes. Considering, for example, the decoding of audio data, assume that the audio decoder delivers a start audio frame interrupt to the CPU running the supervisory process each time decoding of an audio frame commences. At the start of an audio frame, the supervisory process must associate the data currently being read from the audio FIFO with its corresponding presentation time stamp ("PTS"), that is, the PTS value that was loaded in the audio PTS table when the data currently being read was written into the audio FIFO. Theoretically, if the location of the read pointer at the beginning of the audio frame is known, that location can be compared with the write pointer locations that were stored in the PTS table during the demultiplexing process. If a correspondence between the current read pointer location and a stored write pointer location can be found, then the PTS associated with the stored write pointer corresponds to the PTS of the audio data currently being identified by the read pointer. If the PTS value for the data being read can accurately be determined, then the decoding and playback processes may be instructed in the known manner to skip or repeat frames in order to provide a synchronized output of frames of the audio and video.

However, there are two conditions which may result in the above process, on occasion, failing to achieve synchronization in the playback of the audio and video data. The first condition arises because the CPU running the supervisory process must time share between supervision of the audio and video decoding process, and the demultiplexing process. Accordingly, the CPU must respond to each supervised process using prioritized interrupt based communication scheme. Further, the CPU communicates with the memory controller and other functional units over a shared, time multiplexed communication bus or channel. Therefore, when a start audio frame interrupt is received by the CPU, it may not be processed immediately because the CPU is processing other interrupts of an equal or higher priority. Further, even if the CPU services the start audio frame interrupt immediately, it must then communicate with the memory controller over the time multiplexed bus. Access to the bus is arbitrated and the CPU may not have the highest priority. However, during the delay in first, processing the start audio frame interrupt and second, communicating with the memory controller over the time multiplexed bus, the decoding process for the audio data FIFO continues to read audio data from the FIFO. Therefore, when the start audio frame interrupt is serviced by the CPU and the CPU is able to communicate with the memory controller, the location of the audio data FIFO read pointer obtained by the CPU will normally be different from its location when the start audio frame interrupt was initially received by the CPU. Thus, when the CPU responds to the interrupt and obtains the current read pointer for the audio FIFO from the memory controller, the read pointer will no longer have the value it had at the time the interrupt was generated. Therefore, the result of the delay is some inaccuracy in the identity of read pointer location obtained by the CPU.

The second condition of concern is that the audio packets being read may be small and processed very quickly. Therefore, the PTS table may have two PTS entries with FIFO location values that are very close. Hence, when an inaccurate read pointer location is compared to the write pointer location values in the PTS table, an incorrect PTS entry may be associated with the start of the audio frame being decoded. Thus, there will arise a small loss of synchronization between the presentation of the audio and video frames. A single occurrence of the above event might not be detectable by the user. However, if the time to service start audio frame interrupt is longer and the processing time required for the audio data packet is very short, or if several such audio data packets occur successively, the loss of synchronization may be greater. Furthermore, the loss of synchronization in the audio process is cumulative of losses of synchronization in other decoding processes. Thus, accumulated losses of synchronization can occur to the point where the loss of synchronization is disturbing or perceptible to the user.

Consequently, in a system such as that described above, there is a need to improve the association of PTS values stored in PTS tables with the audio and video data being read from respective FIFO memories during the decoding process.

SUMMARY OF THE INVENTION

The present invention provides a method and apparatus for improving the synchronization of the playback of the audio and video frames from a program source. The present invention has the further advantage of providing a wide range of flexibility with respect to how the synchronization is implemented. With the present invention, either the playback of the audio or the playback of the video may be used as a master to which the other in synchronized. In another embodiment, the system time counter is the master and the playback of the frames of audio and video are independently synchronized to the system time counter.

In accordance with the principles of the present invention and in accordance with the described embodiments, a method is described for associating an audio presentation time stamp ("PTS") value with an output audio frame that is a part of the sequence of audio frames that are derived from demultiplexing and decoding audio input data in respective audio data packets. The frames of audio are played back with frames of video being a part of a sequence of frames of video derived by multiplexing and decoding video data in respective video data packets. Selected ones of the audio and video data packets include respective audio and video PTS values representing desired playback times of the respective audio and data associated therewith. The selected ones of the audio data packets further include audio frame numbers representing a number of output frames of audio to be played back between the selected ones of the audio data packets. The method comprises the steps of first storing the audio and video PTS values in respective audio and video PTS tables during an audio demultiplexing process. In addition, the audio frame numbers are stored in frame counters in association with respective PTS values during the demultiplexing process. Thereafter, the method sequentially decodes the audio and video input data to produce respective frames of audio and video which are presented to the user. With the presentation of each audio frame, the audio frame counters are selectively decremented upon detecting one of the audio frame counters having a zero value, the audio PTS value for that zero value audio frame counter is retrieved. Thereafter, the playback of the audio and video frames is adjusted so that they are played back in synchronization.

In one aspect of the invention, the playback of the frames of audio is selected to be the master with which the playback of frames of video is synchronized. In that mode, the process establishes an audio clock extension for a system time counter. The audio clock extension has a value equal to the difference between audio PTS value associated with the zero audio frame counter and the current value of a system time counter. Thereafter, the current state of the system time counter is adjusted by the audio clock extension, thereby bringing the system time counter into synchronization with the playback of frames of audio.

In another aspect of the invention, video PTS values contained in selected ones of the video data packets are stored during a demultiplexing process. Thereafter, at the start of a video decoding process, a number of video frames corresponding to the duration of the video decoding process is stored in respective video frame counters. Upon presenting each of the frames of video, selected ones of the video frame counters are decremented. Upon detecting a video frame counter having a zero value, the system checks to determine whether the video PTS value associated with the zero value video frame counter is equal to the current state of the system time counter plus the audio clock extension. If there is a correspondence between the video PTS value and the value of the system time counter plus the audio clock extension, the audio and video frames are being presented in a synchronized manner.

In accordance with the further aspect of the invention, if the video PTS values is greater than the value of the current state of the system time counter plus the audio clock extension, the video frames are being presented too fast, and a frame of video is repeated to bring it into closer synchronization with the presentation of the frames of audio.

In a still further aspect of the invention, the system determines whether the video PTS value associated with the zero value frame counter is less than the value of the current state of the system time counter plus the audio clock extension. That condition indicates that the frames of video are being presented too slowly with respect to the presentation of the frames of audio, and a subsequent frame of video is skipped, thereby bringing the presentation of the frames of video into closer synchronization with the presentation of the frames of audio.

In accordance with the further embodiment of the invention, the presentation of frames of video is selected to be the master with which the presentation of the frames of audio is synchronized. In that embodiment, a video clock extension to the system time counter is determined as a function of the difference of the video PTS value associated with the video frame counter having a zero value and the current state of the system time counter. In this embodiment, in a manner similar to that described above, an audio PTS value associated with an audio frame counter having a zero value is compared to the current state of the system time counter plus the video clock extension as determined from the video PTS value. If the audio PTS value greater than the current state of the system time counter plus the video clock extension, the audio is being presented too fast with respect to the frames of video; and therefore, a frame of audio is repeated to bring the presentation of audio and video into closer synchronization.

Similarly, in a further aspect of this embodiment, if it is determined that the audio PTS value associated with the zero audio frame counter is less than the current state of the system time counter plus the video clock extension, the audio is being presented too slow with respect to the video and a subsequent frame of audio is skipped, thereby bringing the audio and video presentations into closer synchronization.

In a still further embodiment of the invention, neither the playback of audio frames or the playback of video frames is chosen as a master, and thus, no clock extension is determined. Instead the playback of audio and video is compared to the system time counter, and both the audio and the video are independently adjusted by repeating or skipping frames as required to maintain a correspondence to the system time counter. The above methods provide significant flexibility in synchronizing the playback of audio and video frames.

DETAILED DESCRIPTION OF THE INVENTION

Figure 1:
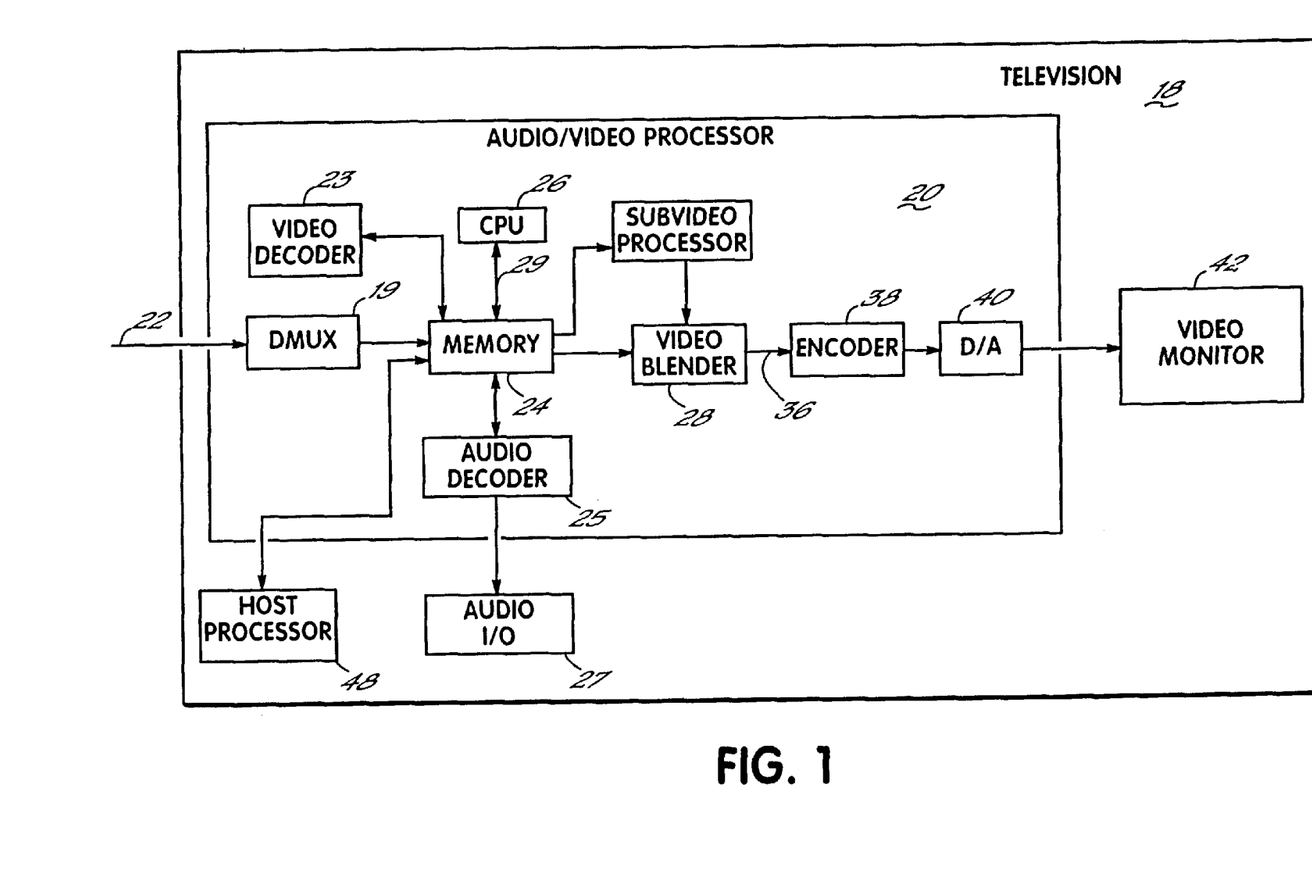
FIG. 1 is a schematic block diagram of only those portions of a television utilizing a digital audio-video processor in accordance with the principles of the present invention.

Referring to FIG. 1, a television 18 contains a digital audio/video processor 20 that receives on input 22 a continuous serial stream of data packets containing the audio and video information required to create the desired video images. The audio and video data may be provided by any one of several devices, for example, a VCR or DVD player, cable, a DSS receiver, a menu display commanded within the television 18, etc.; and the video information may be supplied in any one of several different formats. Normally, the audio and video data packets are provided in the MPEG-2 format.

The audio and video data packets are received and demultiplexed continuously in independent parallel data streams. Further, the decoding and playback of output frames of audio and video data is also performed continuously in parallel data streams independent of the demultiplexing processes. Further, demultiplexing is a process that varies significantly in real time, depending on the nature of audio and video data being received. In addition, the number of video frames to be presented and their order of presentation cannot be determined from the raw video data being received. The creation of video frames and their order of presentation is a function of the decoding process and is determined primarily by the control data in the header portion of the video data packet. Similarly, the raw audio data being received in the data packet bears little resemblance to the audio data output and presented, and the frames of audio data to be presented are created during the decoding process of the audio data.

Finally, it should be noted that output audio frames can be of any length in real time, and further, several audio frames may be associated with single video frame, or in contrast, a single audio frame may be presented during video produced by several video frames. However, it is required that the frames of audio and video be played back in a synchronized manner to provide a coordinated and coherent presentation to the user. To facilitate the coordination of the presentation of the frames of audio and video data, selected ones of the audio and video data packets contain a presentation time stamp "PTS", which is a time reference to a system counter that was running during the creation or recording of the audio and video data. A similar system time counter is running in the CPU 26 during the decoding and playback of the frames of audio and video, and audio and video PTS tables are created during the demultiplexing process. If there is perfect synchronization, when the frames of audio and video are output, their stored PTS values will be the same as the current state of the system time counter. However, the differences in the processing of the audio and video data in separate parallel bit streams does not facilitate such precise timing control. Therefore, for that and other reasons, the playback of the frames of audio and video may lose synchronization with the system time counter. The net result is a loss of synchronization in the audio and video being played back to the user.

Figure 2:
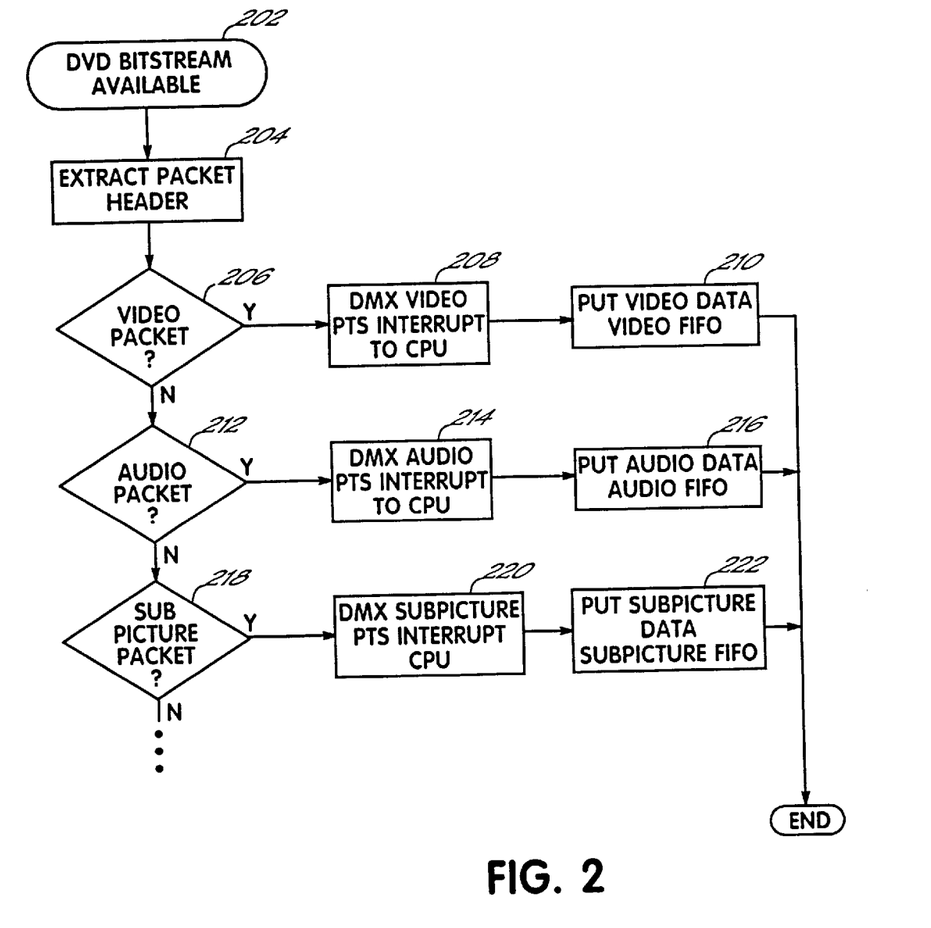
FIG. 2 is a flow chart illustrating the steps of a portion of the demultiplexing process executed by the demultiplexer in accordance with the principles of the present invention.

FIG. 2 is a flow chart illustrating the general operation of the demultiplexer 19 of FIG. 1. At 202, the input 22 to the multiplexer 19 continuously receives an input bit stream of data containing in random order, audio, video and subpicture data packets. The header block of data is extracted at 204, and video data packets are identified at 206. A video demultiplexing interrupt is provided at 208 to the CPU 26 (FIG. 1); and at 210, the video data is sequentially stored in a video data first-in, first-out ("FIFO") buffer 320 (FIG. 4) in memory 24. In a similar process, audio data packets are identified at 212, and an audio demultiplexing interrupt is provided at 214 to the CPU 26. At 216, the video data is sequentially stored in a video data FIFO buffer 300 (FIG. 4) in memory 24 (FIG. 1). Subpicture data packets are identified at 218, and a subpicture demultiplexing interrupt is provided at 220 to the CPU 26. At 222, the subpicture data is sequentially stored in a subpicture FIFO buffer (not shown) in memory 24. While the demultiplexer 19 performs other processing, it does not relate to the synchronization of the audio and video and therefore, will not be further described.

Figure 3:
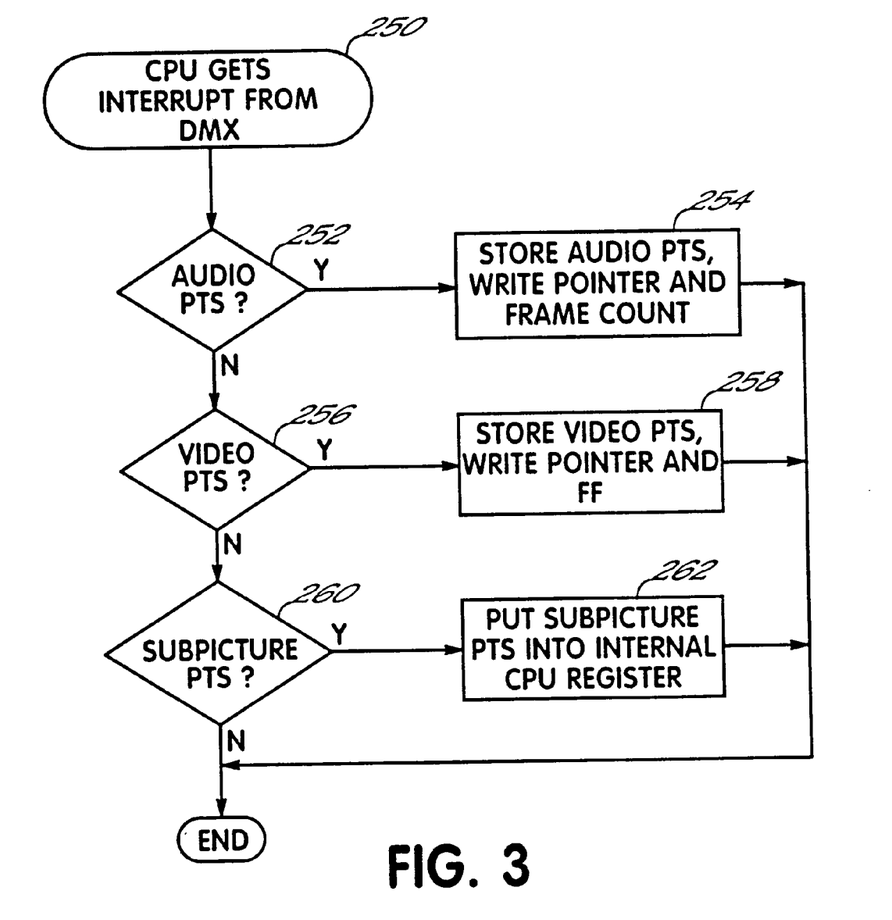
FIG. 3 is a flow chart illustrating the steps of a portion of the demultiplexing process executed by the CPU in accordance with the principles of the present invention.
Figure 4:
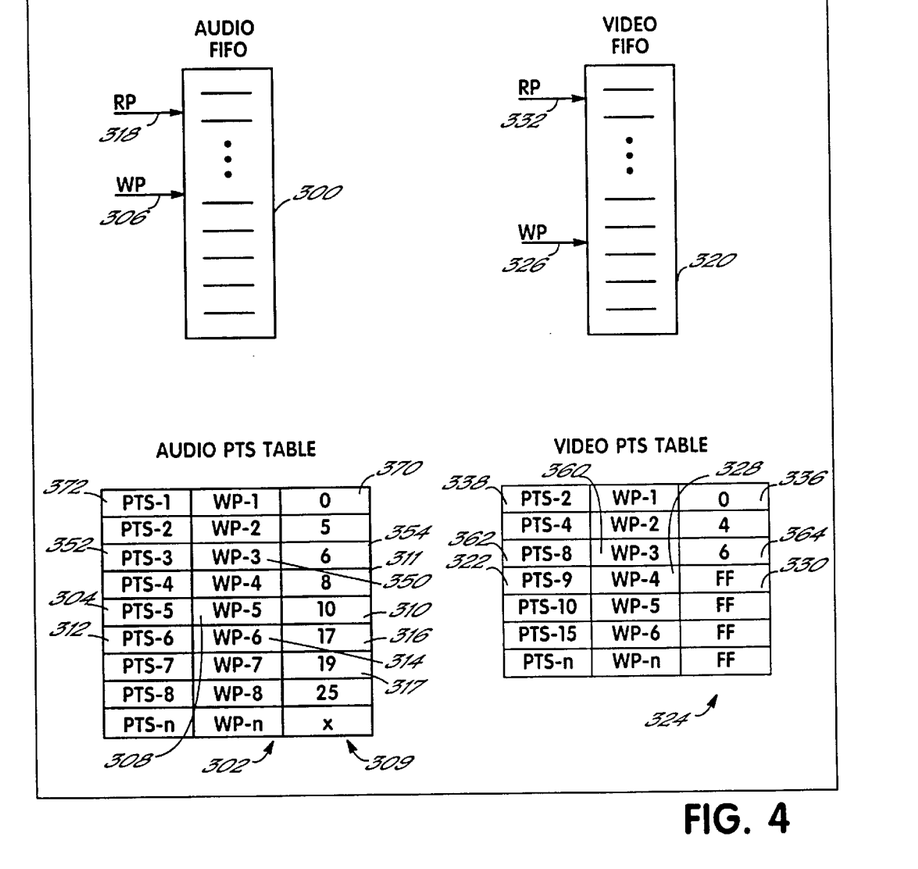
FIG. 4 is a schematic block diagram illustrating audio and video FIFOs and tables within the memory of the processor utilized in executing the audio and video processing as illustrated in FIG. 2.

The demultiplexing process continues in the CPU 26 as illustrated in FIG. 3, and FIG. 4 is a schematic representation of how various portions of audio and video data are partitioned in the memory 24 (FIG. 1). In addition to the audio and video data FIFOs 300, 320 (FIG. 4), the memory 24 includes audio and video PTS tables 302, 324. Referring to FIG. 3, at 250, the CPU 26 services the interrupt from the demultiplexer 19 and determines at 252 whether the interrupt is for an audio PTS interrupt. If so, at 254, the PTS value in the header block of the audio data packet is loaded into audio PTS table 302, for example, at location 304. Further, the location of the write pointer 306 of the FIFO 300 associated with the location of the first byte of audio data loaded in the FIFO 300 is stored in the audio PTS table 302, for example, at location 308.

As previously mentioned, a PTS is only provided with selected audio data packets, however, those same audio data packets also contain, in their header data, a field having an audio frame number representing the number of frames of audio data to be output between the current PTS in the current audio data packet and the next audio data packet containing a PTS value. Further, the audio PTS table 302 includes frame counters, for example, memory locations at 309. And, during the demultiplexing of an audio data packet having a PTS value, that PTS value is loaded into an appropriate memory location, for example, memory location 304. Further, the number of audio frames until the next PTS value is added to the count in the corresponding frame counter, that is, frame counter 310, and the sum is written into the frame counter associated with the next PTS, that is, frame counter 316. For example, if, in the header block for the PTS loaded in memory location 304, the number of frames to the next audio data packet with a PTS is 7, that number, 7, is added to the current count, 10, in frame counter 310; and the sum, 17, is written the counter location 316 to be associated with the next audio data packet having a PTS value.

As will subsequently be explained, while the audio demultiplexing process is being executed, the process of decoding and playing back output audio frames is also running simultaneously and in parallel with the demultiplexing process. Further, with the output of each audio frame, the audio playback process decrements all of the frame counters in the audio PTS table 302. Therefore, when the count for the next PTS is loaded into location 316, the count loaded into location 310 most probably has been decremented from its original value. Consequently, as will be appreciated, the values in the frame counters 309 of the audio PTS table 302 are continuously changing as audio data packets are being demultiplexed and audio data is written into the FIFO 300, and in a simultaneously running parallel process, the audio data is also being read from the FIFO 300, decoded into output audio frames and output to the user.

If, at 256 of FIG. 3, the CPU 26 determines whether the interrupt is for a video PTS. If so, at 258, the video PTS value is sequentially stored in video PTS table 324 (FIG. 4) at, for example, location 322. Further, the location of the write pointer 326 of the video FIFO 320 when it stores the first byte of video data for that packet is written into video PTS table 324, for example, at location 328. The video PTS table 324 also has a frame counter, and during the demultiplexing process, the CPU sets a frame counter location, for example, location 330, associated with the PTS in location 322, to a non-functional value, for example, FF in hexadecimal notation.

If, at 260 of FIG. 3, the CPU determines that the interrupt is for a subpicture PTS; at 262, the CPU stores the subpicture PTS into an internal register (not shown). A PTS value is included with every subpicture data packet, and the corresponding subpicture is output when the system time clock equals the stored PTS. As subpicture synchronization is not as critical as audio/video synchronization, processing of the subpicture data will not be discussed further.

After servicing a demultiplexing interrupt, the demultiplexing process as described with respect to FIGS. 1–4 continues in a similar manner. Raw audio data in the next audio data packet is sequentially loaded into the audio FIFO 300. If the next audio data packet does not have a PTS in its header block, a PTS entry is not made to the audio PTS table 302. If, however, the next audio data packet contains a PTS, that PTS is written into table 302, for example, at location 312. The write pointer location at which the write pointer 306 loads the first audio data for the current audio data packet into FIFO 300 is loaded into location 314. In addition, the number of frames of audio data between the current PTS and the next PTS is added to the count in counter location 316 and loaded into the frame counter location 317. Further, with each successive video data packet, the raw video data is sequentially loaded in the video FIFO 320; and if appropriate, PTS values are loaded in the video PTS table 324 with the respective write pointer locations. The demultiplexing process of the audio, video and subpicture data packets proceeds in the same sequential manner to load the respective FIFOs and PTS tables with the appropriate data.

As will be appreciated, during the demultiplexing process, data is written into the respective audio and video FIFOs 300, 320 as a function of the requirements of the demultiplexing process. Further, during the demultiplexing process, the PTS values are disassociated with their respective audio and video data and stored in the respective PTS tables 302, 324. In simultaneous, independent and parallel processes, the audio and video data is read from the FIFOs 300, 320, decoded in respective audio and video decoders 25, 23 (FIG. 1) and output to the user. During the decoding process, the read pointers 318, 332 of the respective audio and video FIFOs 300, 320 are being moved automatically and continuously by a controller in the memory 24; and hence, the read pointers are not normally controlled by specific instructions from the CPU. In order to synchronize the playback of frames of audio and video data, during the decoding process, the streams of audio and video data being read from the respective FIFOs 300, 320 must be reassociated with the appropriate PTS values stored in the audio and video PTS tables 302, 324.

The audio decoding process is initiated by the audio decoder 25 (FIG. 1) detecting the extraction of the head block at 202 of FIG. 2. The audio decoder 25 then provides an audio decode interrupt to the CPU 26 and begins the process of decoding the next audio data packet. When the audio decoder 25 provides the audio decode interrupt to the CPU 26, the continuously moving read pointer 318 (FIG. 4) is identifying the current location from which the audio decoder is reading data from the FIFO 300. However, the CPU 26 must process a great number of interrupts, each having a different priority and a different real time requirement. Therefore, if the CPU 26 is processing interrupts having a higher priority than the audio decoder interrupt, there is a delay before the audio decoder interrupt can be serviced. Further, the CPU communicates with a memory controller in memory 24 and other functional units over a shared, time multiplexed communication bus or channel 29. Access to the bus is arbitrated, and the CPU may not have the highest priority. However, during the delay in first, processing the start audio frame interrupt and second, communicating with the memory controller over the time multiplexed bus 29, the audio decoder 25 is continuing to read audio data from the audio FIFO 300, and the read pointer 318 is continuously moving.

Figure 5:
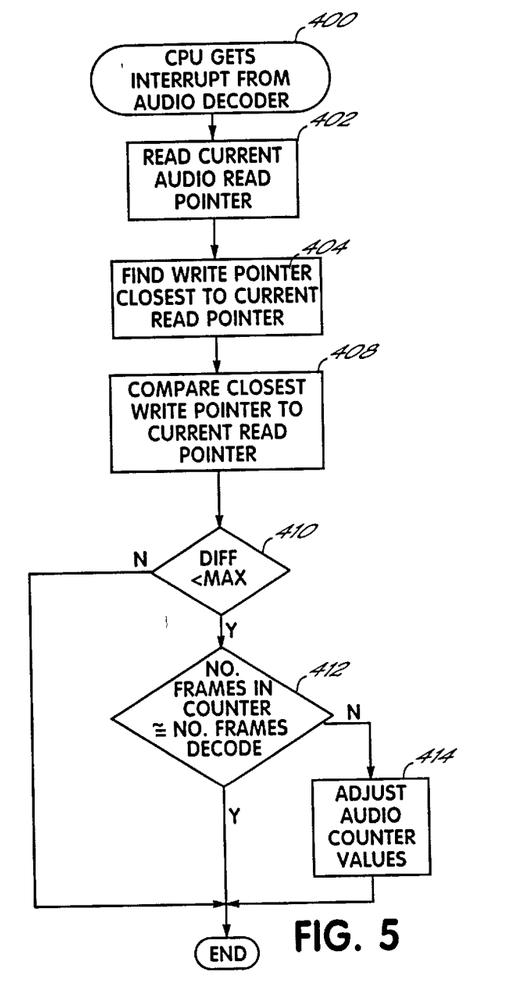
FIG. 5 is a flow chart illustrating the steps of a portion of an audio decoding process executed by the CPU in accordance with the principles of the present invention.

Eventually, at 400 of FIG. 5, the CPU services the audio decode interrupt; and at 402, the CPU 26 reads the current location value of the read pointer 318. However, the current location of the read pointer 318 is different from the location of the read pointer 318 when the audio decode interrupt was first provided to the CPU 26. Next, at 404, the CPU 26 scans all of the write pointer locations stored in the audio PTS table 302 to find a write pointer value that is closest to the current read pointer value, for example, at location 350 (FIG. 4). The closest write pointer value is then subtracted at 408 from the current read pointer value, and the difference is tested at 410 against a maximum allowable difference value. The maximum allowable difference value is a function of the expected motion of the read pointer 318 during a maximum time delay of the CPU 26 in responding to the audio decode interrupt at 400.

If, at 410, the difference between the closest write pointer value in location 350 and the current read pointer value is equal to or greater than the maximum allowable difference value, it is concluded that there is no PTS value, including the PTS value in location 352 of table 302, associated with the audio data currently being read by the read pointer 318. If, at 410, the difference is less the maximum allowable difference value, the PTS value in location 352 associated with the identified write pointer value in location 350 is determined to be associated with the audio data being currently read by read pointer 318.

Then, at 412, the value in the frame counter 354 associated with the closest read pointer value in location 350 is evaluated to determine whether it is approximately equal to the duration or time, that is, the length, of the audio decoding process as measured in terms of number of audio frames. The real time required to decode frames of audio data can be predicted with reasonable accuracy. Further, that period of decoding time can also be calibrated or dimensioned in terms of the number of audio frames of data being decoded. Since the frame counters are decremented with each frame of audio data being output, it can be expected that the frame counter value will be equal to the number of audio frames of decoder delay. Therefore, if the value in the counter location 354 of the PTS table 302 is approximately equal to the expected delay in decoding the current audio data, at the end of that decoding process, the audio data being played back should correspond to the PTS value in the table 302 that has a zero counter value.

However, it is possible that during the decoding process a bit error occurs, and therefore, at 412, it will be determined that the counter value is not approximately equal to the number audio frames of the duration of the audio decoding process. In that event, at 414, the counter value in location 354 is modified and set to the number of audio frames of decoder delay. Hence, with each iteration through the process, any erroneous value in one of the frame counters can be detected and corrected. Alternatively, in addition to changing the value in the one frame counter, the values in the other frame counters below location 354 in the audio PTS table 302 are modified by the same incremental modification that was made to the counter location 354. In summary, during the multiplexing process, the PTS value was disassociated from the audio data in the FIFO 300; but the CPU responds to interrupts during the decoding by re-establishing the association between audio data being read from the FIFO 300 and PTS values in the audio PTS table 302.

Figure 6:
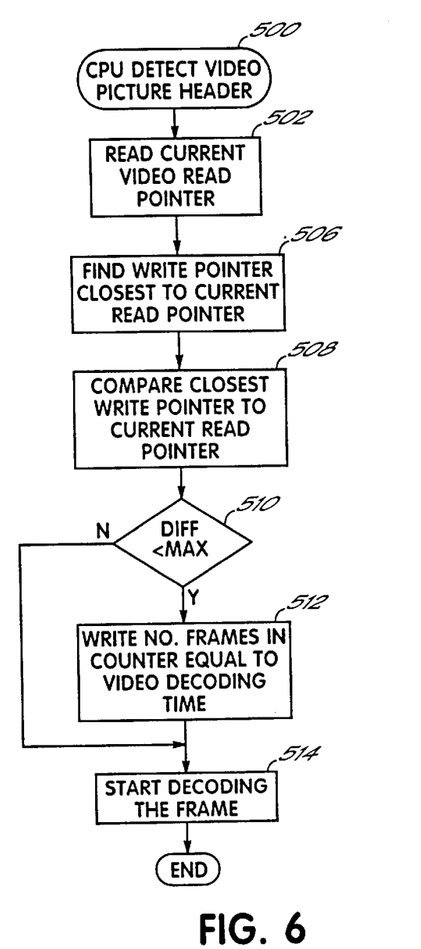
FIG. 6 is a flow chart illustrating the steps of a portion of a video decoding process executed by the CPU in accordance with the principles of the present invention.

Referring to FIG. 6, the video decoding process runs independently, continuously and in parallel with the audio decoding process as well as the video demultiplexing process. The audio decoder 25 (FIG. 1) initiates the audio decoding process; however, in contrast, the CPU 26 initiates the video decoding process. At 500 of FIG. 6, the CPU detects video header that was extracted from the video data packet at 204 of FIG. 2. Thereafter, the video decoding process is functionally similar to the audio decoding process, and at 502, the CPU must read the current location of the read pointer 332 (FIG. 4) of the video FIFO 320. As previously described, this operation is subject to delays encountered in the CPU 26 (FIG. 1) accessing the memory controller in memory 24 over the multiplexed communication bus 29 connected therebetween. Therefore, the read pointer 332 associated with the video data FIFO 320 will have moved from the point in time at which the CPU provided an instruction to read the pointer location and the point in time at which the current read pointer is identified by the CPU. Thereafter, at 506, the CPU finds the closest write pointer in the video PTS table 324, for example, the write pointer in location 360 corresponding to the value of the read pointer location. The difference between the values of current read pointer location and closest write pointer location is determined at 508, and at 510, that difference is compared to a maximum value. As with the audio decoding process, the maximum value is a function of the delay in the CPU 26 determining the current location of the read pointer 332.

If the difference is equal to or exceeds the maximum value it is concluded that the video data associated with the current value of the read pointer does not have a corresponding PTS value stored in the video table 324. However, if the difference between the values of the closest write pointer and the current read pointer values is less than the maximum value, the PTS value in location 362 associated with the closest write pointer value in location 360 is determined to be associated with the video data being read by the read pointer 332. Further, at 512, the counter value at location 364 of the video PTS table 324 is set to a value equal to the delay in the video decoding process as measured in terms of the number of frames of video data being decoded. As with the audio data, the real time required to decode the video data is predictable with reasonable accuracy. Further, the time required to process the video data associated with the current location of the read pointer can be calibrated or dimensioned in units corresponding to the number of frames of video data Therefore, the number frames of video data expected to be processed through the video decoder 23 prior to the video data associated with the current position of the read pointer being played back from the video decoder is loaded in the counter location 364 of the video PTS table 324. Thereafter, at 514, the CPU 26 provides a command to the video decoder 23 to initiate the video decoding process.

Figure 7:
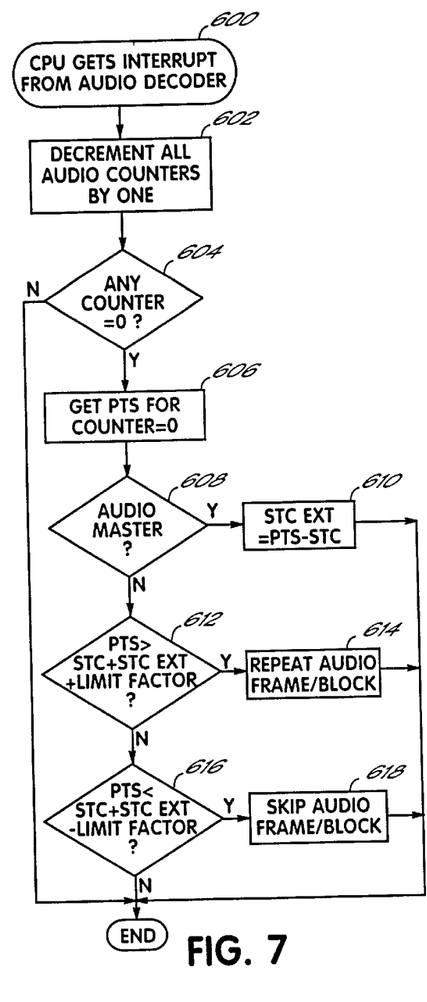
FIG. 7 is a flow chart illustrating the steps of portion of a process executed by the CPU for playing back output frames of audio data in accordance with the principles of the present invention.

As described above, audio and video data is being continuously read from the respective audio and video FIFOs 300, 320 (FIG. 4); and the read data is being continuously but independently processed in parallel by the respective audio and video decoders 25, 23 (FIG. 1). During the audio decoding process, the audio decoder 25 will create an audio frame that is ready to be output to the user. At that time, the audio decoder 25 provides an audio frame interrupt to the CPU 26 and thereafter, immediately proceeds to start the playback of the audio frame. Referring to FIG. 7, the CPU 26 at 600 services the audio frame interrupt, and at 602, proceeds to decrement by one all of the frame counters 309 in the audio PTS table 302 (FIG. 4). Next at 604, the CPU 26 determines whether any frame counter state is equal to zero. If a zero value is found, for example, in counter location 370, the CPU 26 then at 606 retrieves the audio PTS value associated with the zero counter value, for example, from memory location 372.

When a counter state is found to be zero, the CPU 26 at 608, then determines whether the audio has been selected to be the master. There are several different approaches to providing audio/video synchronization. As earlier described, a system time counter is running in the CPU 26 during the playback of the audio and video frames. If there is perfect synchronization, when the frames of audio and video are output, their stored PTS values will be the same as the current state of the system time counter. However, during playback, either one of the audio or video streams of output frames may lose synchronization with the system time counter and hence, with each other. One approach to synchronization is to choose the audio to be a master and synchronize the video to the audio. A second approach is to choose the video to be a master and synchronize the audio to the video. A third approach is to synchronize both the audio and video to the system time counter. There are perceived advantages and disadvantages to each approach depending on the source of program material, the format of the program material, other capabilities of the audio/video processor, etc. Normally, the selection of an audio, video or no master is a system parameter that may be selected by the manufacturer of the television unit. Alternatively, the selection could also be provided to the user. In other applications, the master could be dynamically chosen by the audio/video processor.

If at 608 of FIG. 7, the CPU 26 determines that the audio is the master, the CPU creates at 610 an extension or offset for the system time counter equal to the difference between the current value of the system time counter and the PTS value associated with the zero counter value, that is, for example, the PTS value in table location 372. This system time clock extension is used in synchronizing video, as discussed below. If at 608, the CPU determines that the audio is not the master, then at 612, the CPU determines whether the PTS value associated with the PTS table counter having a zero value is within a certain range of the current value of the system counter added to the current system time clock extension. If video master mode is used, the video playback process will create and update values for the system time clock extension (in a manner similar to that described above at 608 with respect to the audio master). However, if neither the audio or the video is chosen as master, the system time clock extension will have a zero value. In step 612, the selected PTS is compared to the current value of the system time clock, added to the system time clock extension, plus a constant, limit factor. For the audio, the magnitude of the limit factor is approximately equal to the delay of the CPU in responding the PTS interrupt as well as the delay in communicating with the memory controller plus an acceptable degree of error in audio-video synchronization.

If at 612, the PTS value from the PTS table 302 is greater than the current value of the system time counter plus its extension and plus the limit factor, that means that the audio frames are being played back faster or ahead of when the system is expecting them to be played back. Thus, there is an apparent loss of synchronization between the audio frame and the video frame being presented. To correct that loss of synchronization, the CPU 26 at 614 provides instructions to the audio decoder 25 to repeat an audio frame. Repeating an audio frame while permitting the video frames to proceed through their natural progression permits the audio frames to slide back in time and regain their synchronization with the video frames.

If the comparison at 612 is negative, the CPU 26 then at 616 determines whether the PTS value from the PTS table 302 is less than the current value of the system time counter plus its extension and minus the limit factor. If so, that means that the audio frames are being played back slower or behind of when the system time counter is expecting them to be played back. To correct that loss of synchronization, the CPU 26 at 618 provides instructions to the audio decoder 25 to skip an audio frame. Skipping the audio frame while permitting the video frames to proceed through their natural progression permits the audio frames to slide forward in time and regain their synchronization with the video frames.

Figure 8:
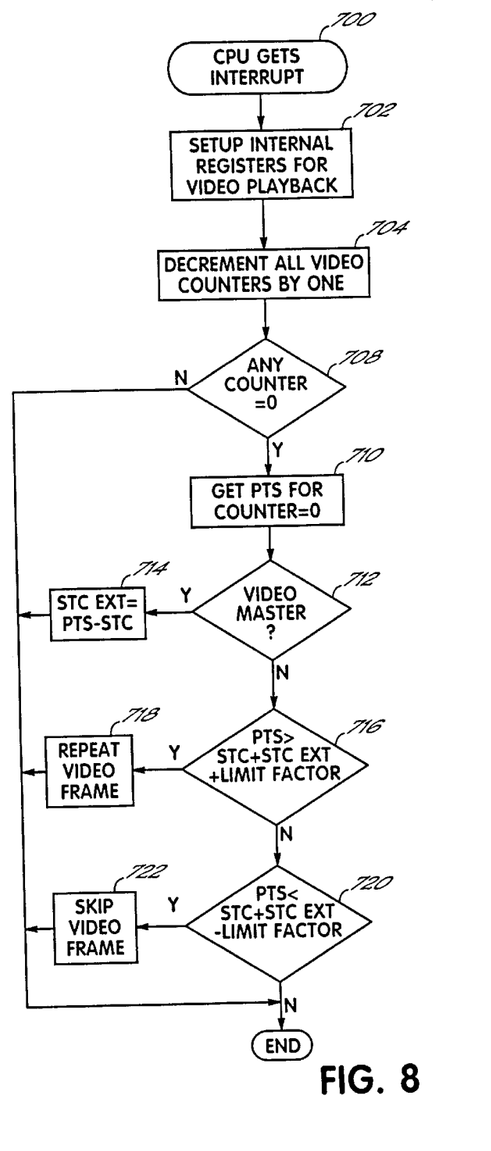
FIG. 8 is a flow chart illustrating the steps of a portion of a process executed by the CPU for playing back output frames of video data in accordance with the principles of the present invention.

Referring to FIG. 8, except for its initiation, the video frame output process is similar to the audio frame output process of FIG. 7. At 700, the CPU 26 services an interrupt created from the raster scanning process which controls the playback of the video frames. After servicing the interrupt at 700, the CPU 26 then at 702 initializes various internal registers for video playback. Next, at 704, the CPU 26 decrements all of the frame counters, for example, frame counters 336, 364, etc.; but the CPU does not decrement the video frame counters having an FF value. Then at 708, the CPU determines whether any of those frame counters have a zero value. If a zero counter value is found, for example, at location of 336, then at 710, the CPU retrieves that video PTS value.

If at 712 of FIG. 8, the CPU 26 determines that the video is the master, the CPU creates at 714 an extension or offset for the system time counter equal to the difference between the current value of the system time counter and the video PTS value associated with the zero counter value, that is, for example, the PTS value in table location 338. If at 712, the CPU determines that the video is not the master, then at 716, the CPU determines whether the video PTS value associated with the PTS table counter having a zero value is within a certain range of the current value of the system counter. At 716, the CPU determines whether the video PTS value from the PTS table location 338 is greater than the current value of the system time counter plus its extension and plus a limit factor. In the case of video, the limit factor is chosen to be approximately equal to one-half the duration of the shortest video frame. If the comparison at step 716 is true, that means that the video frames are being played back faster or ahead of when the system is expecting them to be played back. To correct that loss of synchronization, the CPU 26 at 718 provides instructions to the video decoder 23 to repeat a video frame. Repeating the video frame while permitting the audio frames to proceed through their natural progression permits the video frames to slide back in time and regain their synchronization with the audio frames.

If the comparison at 716 is false, the CPU 26 then at 720 determines whether the PTS value from the PTS table location 338 is less than the current value of the system time counter plus its extension and minus the limit factor. If so, that means that the video frames are being played back slower or behind of when the system time counter is expecting them to be played back. To correct that loss of synchronization, the CPU 26 at 722 provides instructions to the video decoder 23 to skip a video frame. Skipping the video frame while permitting the audio frames to proceed through their natural progression permits the video frames to slide forward in time and regain their synchronization with the audio frames.

Thus, the audio and video output processes operate in parallel continuously and independently to provide synchronized audio and video presentations to the user. During that process, the PTS of the video frame being presented is compared to the PTS of the currently presented audio frame; and if any loss of synchronization is detected, a video frame is repeated or skipped to regain synchronization.

The system described above has a significant advantage over the prior system previously described herein. With the prior system, delays in servicing the audio PTS interrupt in combination with audio data packets that could be processed very quickly had the potential of selecting the wrong audio PTS value from the audio PTS table. In such a case, a wrong audio PTS value would be associated with the audio data being read from the audio data FIFO. With the prior system, the counters in the audio PTS table 302 operate the same as the video counters described with respect to FIG. 6 herein. Thus, the audio PTS table counter locations 309 are, during the audio decoding process loaded with a number of audio frames corresponding to the audio decoder time. Therefore, in the prior system if the wrong audio PTS value were chosen from the PTS table, after the decoding delay, that erroneous choice would cause an erroneous frame counter value to be stored in table 302. Further, that erroneous PTS value would then be used in an attempt to synchronize the playback of the audio and video and might result in a perceptible loss of synchronization between the audio and video being presented to the user.

With the present invention, the known number of audio frames provided in the header information of the audio data packet is used in generating the frame counters in the audio PTS table 302 along with an associated PTS value as part of the demultiplexing process. Further, during the decoding process with the output of each audio frame, the frame counter is decremented, and therefore, the number of audio frames being decoded and output with respect to each PTS value in the audio PTS table 302 is accurately tracked during the decoding process of each audio data packet. This is a far more accurate approach to associating a PTS value with decoded data being output, than the prior method of comparing memory pointers to identify a PTS value. Accordingly, with the present system, memory pointer comparisons are only used to check whether the audio PTS table counter values are approximately equal to the audio decoder delay to correct bit errors should any occur.

With the present invention, by using the audio frame number from the header to lock the PTS values of the decoding process to the audio frame counter in the CPU, the coordination of the audio PTS values with demultiplexed audio data can be maintained very accurately throughout the playback process. The header portion of the video data packet does not contain similar information with respect to the number of video frames to be expected between PTS values. However, with the present invention, since the audio frame presentation is very precise, adjusting the audio and video synchronization pursuant to the processes of FIGS. 7 and 8 provides a highly synchronized audio and video presentation to the user that conforms very closely to the desired playback.

While the invention has been illustrated by the description of a preferred embodiment and while the embodiment has been described in considerable detail, there is no intention to restrict nor in any way limit the scope of the amended claims to such detail. Additional advantages and modifications will readily appear to those who are skilled in the art. For example, the header block of an audio data packet that has a PTS value also includes the number of bytes of audio data between successive audio PTS values, in other words, the number of bytes of audio data in the current data packet plus the number of bytes of audio data in successive audio data packets until the next data packet having an audio PTS value. This data can be stored in the write pointer location instead of storing the write pointer locations in the audio and video PTS tables 302, 324.

In FIG. 4, the frame counter values are created by adding the number of audio frames from the header block of the audio data packet to the value in the prior counter and the sum is written into the counter associated with the current PTS value. Further, all of the frame counter values are decremented by one with the output of each audio frame.

Alternatively, the number of audio frames from the the header block of the audio data packet may be written into the frame counter; however in this case, only the currently active counter is decremented in response to the output of an audio frame. When that counter reaches zero, then the next counter is decremented.

As described, the audio/video synchronization is normally performed with respect to the system time counter in the system. The system time counter is a counter that, when operated in the playback of audio and video data, provides counter states that are directly related to PTS values. The synchronization may be performed using any other counter or clock that has respective counter or clock states that are correlated to the PTS values. Therefore, the invention in its broadest aspects is not limited to the specific details shown and described. Consequently, departures may be made from the details described herein without departing from the spirit and scope of the claims which follow.

What is claimed is:

1. A method for associating an audio presentation time stamp ("PTS") value with an output frame of audio being a part of a sequence of frames of audio derived by demultiplexing and decoding audio input data in respective audio data packets, the output frames of audio being played back with output frames of video being a part of a sequence of frames of video are derived by demultiplexing and decoding video data in respective video data packets, selected ones of the audio and video data packets include respective audio and video PTS values representing desired playback times of the respective audio and video data associated therewith, the selected ones of the audio data packets further including audio frame numbers representing a number of output frames of audio to be played back between the selected ones of the audio data packets, the method comprising the steps of:

storing the audio and video PTS values contained in the selected ones of the respective audio and video data packets during respective audio and video demultiplexing processes;

storing audio frame numbers in respective audio frame counters during the audio demultiplexing process, each of the audio frame counters being associated with one of the stored audio PTS values;

sequentially decoding the audio and video data in the selected ones of the respective audio and video data packets to produce the frames of audio and video, respectively;

providing a simultaneous playback of the frames of audio and video to the user;

selectively decrementing the audio frame counters in response to presenting each of the frames of audio;

detecting one of the audio frame counters having a zero value; and if so, retrieving the audio PTS value corresponding to the one of the audio frame counters; and selectively modifying the playback of the frames of audio and video to synchronize the presentation of the audio and video to the user.

2. The method of claim 1 further comprising after the step of retrieving the audio PTS value, the steps of:

providing a audio clock extension for a system time counter approximately equal to a difference between an audio PTS value associated with the one of the audio frame counters and a current value of the system time counter; and adjusting a current state of the system time counter by the audio clock extension, thereby bringing the system time counter in synchronization with the playback of the frames of audio.

3. The method of claim 2 further comprising the steps of:

storing at the start of a video decoding process for the selected ones of the video data packets, a number of video frames in respective video frame counters, the number of video frames representing a time duration approximately equal to a duration of the video decoding process;

decrementing all of the video frame counters in response to presenting each of the frames of video;

detecting one of the video frame counters having a zero value; and if so, retrieving the video PTS value corresponding to the one of the video frame counters; and determining a video PTS value associated with the one of the video frame counters to be approximately equal to the current state of the system time counter plus the audio clock extension, thereby determining that the frames of audio and video are in synchronization.

4. The method of claim 3 further comprising the steps of:

determining in response to the one of the video frame counters having a zero value that the frames of video are currently being presented to the user too fast and out of synchronization with the frames of audio currently being presented to the user; and repeating a frame of video to bring the frames of video into closer synchronization with the presentation of the frames of audio.

5. The method of claim 4 further comprising the step of determining a video PTS value associated with the one of the video frame counters to be greater than the current state of the system time counter plus the audio clock extension, thereby indicating that the frames of video are being presented too fast with respect to the presentation of the frames of audio.

6. The method of claim 5 further comprising the steps of:

determining in response to the one of the video frame counters having a zero value that the frames of video are currently being presented to the user too slowly and out of synchronization with the frames of audio currently being presented to the user; and skipping a frame of video to bring the frames of video into closer synchronization with the presentation of the frames of audio.

7. The method of claim 6 further comprising the step of determining a video PTS value associated with the one of the video frame counters to be less than the current state of the system time counter plus the audio clock extension, thereby indicating that the frames of video are being presented too slowly with respect to the presentation of the frames of audio.

8. The method of claim 7 further comprising the step of determining a video PTS value associated with the one of the video frame counters to be less than the current state of the system time counter plus the audio clock extension minus a limit factor, the limit factor being determined as a function of the delays in decoding the audio data.

9. The method of claim 8 further comprising the step of detecting the selection of an audio master synchronization determining a synchronization of the playback of frames of video to the playback of frames of audio.

10. The method of claim 1 further comprising the steps of:
storing at the start of a video decoding process for the selected ones of the video data packets, a number of video frames in respective video frame counters, the number of video frames representing a time duration approximately equal to a duration of the video decoding process;

decrementing all of the video frame counters in response to presenting each of the frames of video;

detecting one of the video frame counters having a zero value; and if so, retrieving the video PTS value corresponding to the one of the video frame counters;

providing a video clock extension for the system time counter approximately equal to a difference between a video PTS value associated with the one of the video frame counters and a current value of the system time counter; and adjusting a current state of the system time counter by the video clock extension, thereby bringing the system time counter in synchronization with the playback of the frames of video.

11. The method of claim 10 further comprising the steps of:
determining in response to the one of the audio frame counters having a zero value that the frames of audio are currently being presented to the user too fast and out of synchronization with the frames of video currently being presented to the user; and repeating a frame of audio to bring the frames of audio into closer synchronization with the presentation of the frames of video.

12. The method of claim 11 further comprising the step of determining an audio PTS value associated with the one of the audio frame counters to be greater than the current state of the system time counter plus the video clock extension, thereby indicating that the frames of audio are being presented too fast with respect to the presentation of the frames of video.

13. The method of claim 12 further comprising the step of determining an audio PTS value associated with the one of the audio frame counters to be greater than the current state of the system time counter plus the video clock extension plus a limit factor, the limit factor being determined as a function of the video frame length.

14. The method of claim 13 further comprising the steps of:
determining in response to the one of the audio frame counters having a zero value that the frames of audio are currently being presented to the user too slowly and out of synchronization with the frames of video currently being presented to the user; and skipping a frame of audio to bring the frames of audio into closer synchronization with the presentation of the frames of video.

15. The method of claim 14 further comprising the step of determining an audio PTS value associated with the one of the audio frame counters to be less than the current state of the system time counter plus the video clock extension, thereby indicating that the frames of audio are being presented too slowly with respect to the presentation of the frames of video.

16. The method of claim 15 further comprising the step of determining an audio PTS value associated with the one of the audio frame counters to be less than the current state of the system time counter plus the video clock extension minus a limit factor the limit factor being determined as a function of the video frame length.

17. The method of claim 16 where in the limit factor is approximately equal to approximately one-half of a duration of a shortest video frame.

18. The method of claim 17 further comprising the step of detecting the selection of a video master synchronization determining a synchronization of the playback of frames of audio to the playback of frames of video.

19. The method of claim 11 further comprising the step of determining an audio PTS value associated with the one of the audio frame counters to be greater than the current state of the system time counter, thereby indicating that the frames of audio are being presented too fast with respect to the presentation of the frames of video.

20. The method of claim 19 further comprising the step of determining an audio PTS value associated with the one of the audio frame counters to be greater than the current state of the system time counter plus a limit factor, the limit factor being determined as a function of the video frame length.

21. The method of claim 20 further comprising the steps of:
determining in response to the one of the audio frame counters having a zero value that the frames of audio are currently being presented to the user too slowly and out of synchronization with the frames of video currently being presented to the user; and skipping a frame of audio to bring the frames of audio into closer synchronization with the presentation of the frames of video.

22. The method of claim 21 further comprising the step of determining an audio PTS value associated with the one of the audio frame counters to be less than the current state of the system time counter, thereby indicating that the frames of audio are being presented too slowly with respect to the presentation of the frames of video.

23. The method of claim 22 further comprising the step of determining an audio PTS value associated with the one of the audio frame counters to be less than the current state of the system time counter minus a limit factor, the limit factor being determined as a function of the video frame length.

24. The method of claim 23 wherein the limit factor is approximately equal to approximately one-half of a duration of a shortest video frame.

25. The method of claim 24 further comprising the steps of:
determining in response to the one of the video frame counters having a zero value that the frames of video are currently being presented to the user too fast and out of synchronization with the frames of audio currently being presented to the user; and repeating a frame of video to bring the frames of video into closer synchronization with the presentation of the frames of audio.

26. The method of claim 25 further comprising the step of determining a video PTS value associated with the one of the video frame counters to be greater than the current state of the system time counter, thereby indicating that the frames of video are being presented too fast with respect to the presentation of the frames of audio.

27. The method of claim 26 further comprising the step of determining a video PTS value associated with the one of the video frame counters to be greater than the current state of the system time counter plus a limit factor, the limit factor being determined as a function of the delays in decoding the audio data.

28. The method of claim 27 further comprising the steps of:

determining in response to the one of the video frame counters having a zero value that the frames of video are currently being presented to the user too slowly and out of synchronization with the frames of audio currently being presented to the user; and skipping a frame of video to bring the frames of video into closer synchronization with the presentation of the frames of audio.

29. The method of claim 28 further comprising the step of determining a video PTS value associated with the one of the video frame counters to be less than the current state of the system time counter, thereby indicating that the frames of video are being presented too slowly with respect to the presentation of the frames of audio.

30. The method of claim 29 further comprising the step of determining a video PTS value associated with the one of the video frame counters to be less than the current state of the system time counter minus a limit factor, the limit factor being determined as a function of the delays in decoding the audio data.

31. The method of claim 30 further comprising the step of detecting the selection of a no master synchronization for which no clock extension is determined or used and both the video and audio are independently synchronized to the system time counter.

32. A method for synchronizing a play back of frames of audio and video output data, the frames of audio and video output data being derived from demultiplexing and decoding audio and video data contained in respective audio and video data packets, selected ones of the audio and video data packets containing presentation time stamp PTS values, and the selected ones of the audio data packets containing audio frame numbers, each of the audio frame numbers representing a number of frames of audio to be played back between the selected ones of the audio data packets, the method comprising:

sequentially storing during an audio demultiplexing process of the audio data packets containing PTS values, audio data in respective audio FIFO memory locations;

sequentially storing PTS values in first memory locations in an audio PTS memory table during the first demultiplexing process;

storing in second memory locations in the audio PTS table during the first demultiplexing process, write pointer locations associated with the data written into the video FIFO memory locations for the selected video data packets containing a PTS value;

storing audio frame numbers in counter memory locations in the PTS table during the first demultiplexing process;

initiating an audio decoding process simultaneously with the a start audio frame interrupt to a CPU;

acquiring a read pointer location of the audio FIFO in response to the start audio frame interrupt;

finding a write pointer location in the audio PTS table approximately equal to the read pointer location;

decoding the audio data being read from the audio FIFO;

presenting a successive audio output frame to the user;

decrementing all of the counter memory locations in the audio PTS table by one;

detecting any of the counter locations having a zero value; and if so, adjusting a current state of a system time counter to the PTS value in the audio PTS table associated with the counter having a zero value.

33. A digital video processor for synchronizing a play back of output frames of audio and video data derived from demultiplexing and decoding audio and video data contained in audio and video data packets and selected ones of the audio and video data packets containing a presentation time stamp value, the video processor comprising:

audio and video FIFO memories for sequentially storing the audio and video data contained the respective audio and video data packets;

an audio PTS memory table having
first memory locations for sequentially storing the PTS values in the selected ones of the audio data packets,
second memory locations for storing values representing write pointer locations associated with the data written into the audio FIFO memory location in the selected audio data packets containing a PTS value, and
third memory locations functioning as counter locations for storing audio frame numbers, each representing a number of frames of audio to be played back until an occurrence of a subsequent PTS value; and a video PTS memory table having
first memory locations for sequentially storing the PTS values in the selected ones of the video data packets,
second memory locations for storing values representing write pointer locations associated with the data written into the video FIFO memory locations for the selected video data packets containing a PTS value, and
third memory locations functioning as counter locations for storing a value representing a number of frames of video approximately equal to a delay time required for decoding a frame of video data prior to its play back to a user.

* * * * *